July 7, 1931. J. M. BONBRIGHT 1,813,380
AUTOMOBILE BODY CONSTRUCTION
Filed Nov. 2, 1929  2 Sheets-Sheet 1
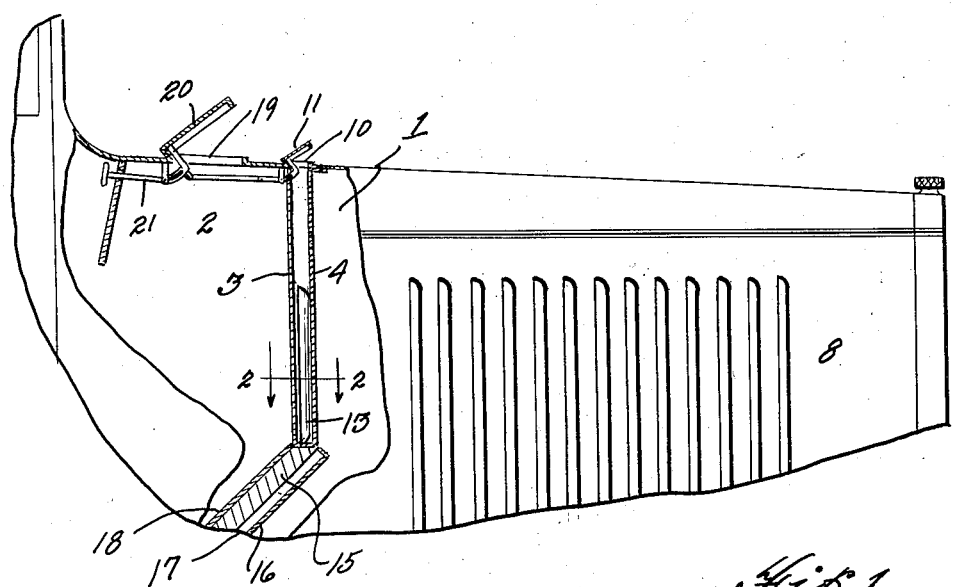
Fig. 1
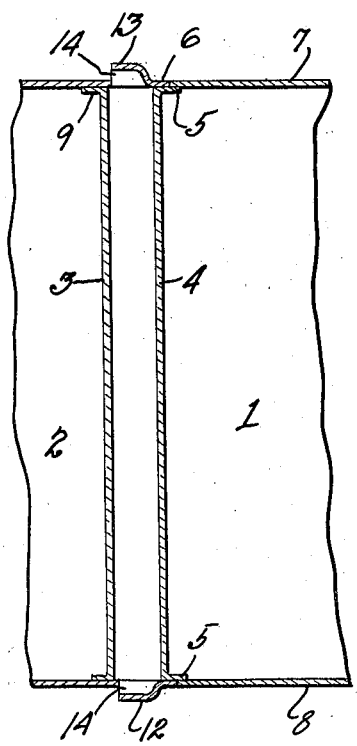
Fig. 2
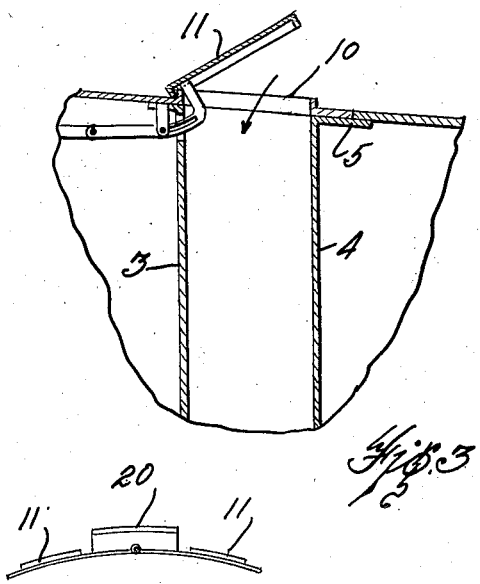
Fig. 3
Fig. 4
INVENTOR.
JOHN M. BONBRIGHT
BY
ATTORNEY.

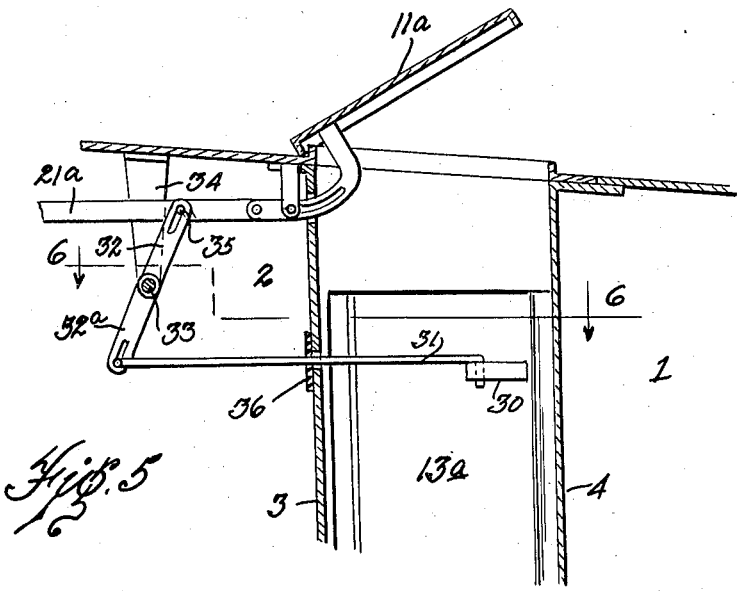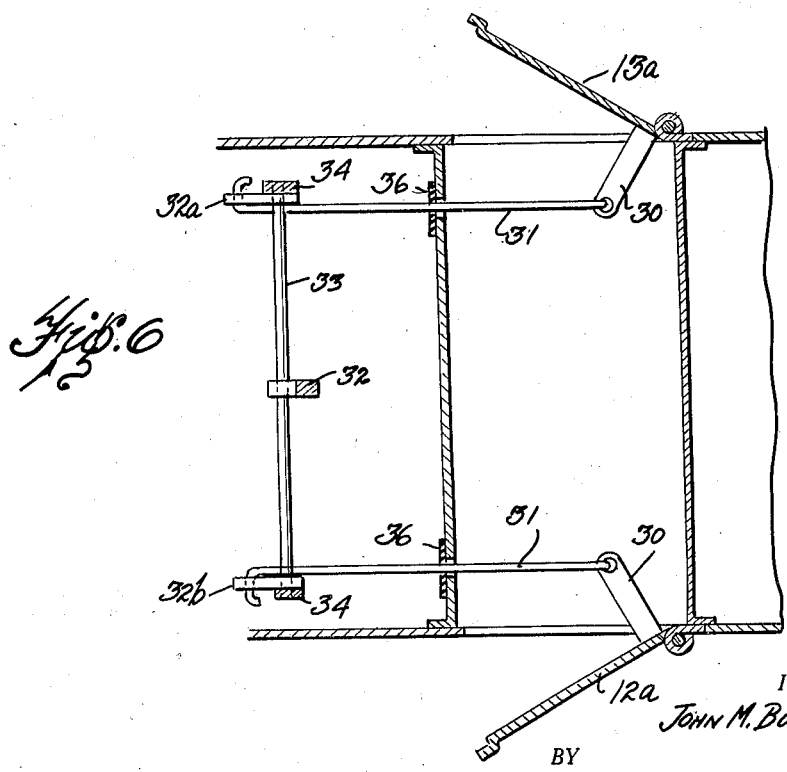

Patented July 7, 1931

1,813,380

UNITED STATES PATENT OFFICE

JOHN M. BONBRIGHT, OF DETROIT, MICHIGAN

AUTOMOBILE BODY CONSTRUCTION

Application filed November 2, 1929. Serial No. 404,486.

This invention relates to automobile body construction and its primary object is to provide means for preventing the heat in the engine compartment of an automobile from passing to the passenger compartment and is in the form of what may be termed a ventilator.

The feature of the invention is in the provision of a hollow chamber extending transversely of the body in the position of the usual dash of an automobile separating the engine compartment from the passenger compartment adapted to be opened at its upper end to permit a flow of air thereinto and to discharge the same at the bottom of the chamber or hollow dash on opposite sides of the forward end of the body and to in this manner carry the heat away from the forward wall of the chamber and prevent the heating of the dash not only immediately forward of the feet of the occupants of the forward seat of the vehicle but throughout the surface thereof.

I am aware of previous constructions in which various channels are provided through which air may flow but in such previous structures, so far as known to me, a greater or less portion of the dash is directly subjected to the heat of the engine compartment the heated air in which is driven rearwardly by the radiator fan directly against the dash and thus directly heating the forward portion on which the feet of the passengers in the forward portion of the vehicle usually rest.

It is a purpose of the invention to obviate to as great an extent as possible such defect in automobile body construction.

These and other objects and various novel features of construction and operation of the invention are hereinafter more fully described and claimed. The preferred form of construction of a device embodying my invention is shown in the accompanying drawings in which—

Fig. 1 is a sectional view of a portion of an automobile body showing my improved construction for preventing the transfer of heat from engine compartment to the vehicle body.

Fig. 2 is a transverse section taken on line 2—2 of Fig. 1.

Fig. 3 is an enlarged view showing more clearly the construction of the dash between the hood and body of the vehicle.

Fig. 4 is a diagram of an alternate form of construction.

Fig. 5 is a vertical section of an alternative form of construction in which the cowl ventilator and louvres are jointly operable.

Fig. 6 is a section taken on line 6—6 of Fig. 5.

In Fig. 1 I have shown a ventilator and one form of construction of means for preventing heated air accumulating in the forward end of the passenger compartment or being transmitted thereto from the engine compartment.

The invention fundamentally in its preferred form consists in the formation of a dash or wall between the engine compartment 1 of the vehicle and the forward end of the passenger compartment 2 of two spaced plates 3 and 4 of any approved material, preferably metal, which extend entirely across the forward end of the vehicle transversely thereof as will be understood from Fig. 2. This dash formed of the two spaced walls is positioned practically in the same relation with the body and hood as in the solid dash ordinarily used and I preferably provide a flange 5 on the top and sides of the forward wall 4 which extends beyond the forward edge 6 of the body providing a seat for the hinged side members 7 and 8 of the hood, the flange being of sufficient width to provide a support for both the forward edge of the body and the rear edge of the hood. The rear wall 3 may also be flanged as at 9 providing a support for the body and means for securing the wall in place. As previously stated, these two spaced walls extend transversely of the vehicle and an opening 10 is provided in the body preferably centrally thereof and a hinged cap 11 is provided opening rearwardly providing, when the vehicle is moving, a baffle or deflector tending to force air downwardly into the chamber between the walls 3 and 4.

The body of the vehicle on opposite sides thereof and at the bottom of the chamber formed by the spaced walls 3 and 4 is formed with louvres 12 and 13 through which air passing into space at the top is discharged at the bottom. This arrangement insures that air passing into the chamber will pass throughout the full height and to be distributed across the chamber so that the heat that may be absorbed by the forward plate 4 is carried away by this air flow during operation of the vehicle and the rear wall 3 of the dash maintained comparatively cool. The louvres also, by reason of movement of the vehicle, tend to produce a partial vacuum at the rear face and thus air is induced to flow through the chamber both by the deflector 11 and the louvres 12 and 13. If the vehicle be standing idle with the engine compartment in a heated condition the air in the space between the walls would tend to increase in temperature through transmission of the heat through the forward wall 4 of the dash and, due to the chamber being open at the bottom on opposite sides through the openings 14 formed by the louvres 12 and 13, the heated air tending to rise through the opening 10 will draw cold air in at the bottom through the openings 14 and thus also tend to absorb the heat from the wall 4 and discharge the same to the exterior of the vehicle. Thus, whether the vehicle be moving or stationary, atmospheric air is caused to move through the chamber provided by this hollow dash.

The louvres having the openings 14 positioned at the bottom of the chamber 4 provide for a drainage of the chamber which is otherwise closed at the bottom. This bottom edge may terminate at any convenient point. As is here illustrated, I preferably support the bottom on the upper edge of the footboard 15. In the event this construction is utilized I preferably provide a shield 16 on the engine side of the footboard forming a chamber 17 open at its bottom transversely of the vehicle to atmosphere. The usual foot pedals, not here shown, pass through a slot in the footboard and this shield 16 will of necessity be apertured for the same purpose. The face of the footboard in the compartment 2 is usually covered with a rubber or other material indicated at 18 which forms a close fit about the foot pedals or operating levers (not here shown) as is the usual practice in automobile construction.

The essential features of my invention, therefore, are the hollow dash, the manually operable cover for the opening thereto at the top, the side louvres providing for an egress or ingress of air as above stated at the bottom and so constructed the device is simple and highly efficient in operation.

An added feature and an alternative form of structure is shown in Fig. 1 in which a second opening 19 is formed in the upper part of the forward portion or cowl of the body directly over the footboard. This opening is provided with a hinged cover 20 operable preferably, although not necessarily, by the same bar 21 with which the hinged cover member 11 for the aperture 10 is connected. Thus, with this form of ventilator arrangement, shown in Fig. 1, not only may air be discharged from the space between the walls 3 and 4 but on movement of the vehicle fresh air may also be forced into the forward end of the passenger compartment. While I have shown the two cover members 11 and 20 as being connected to the same operating lever such arrangement for operation is not essential but in the event both hinged cover members are utilized I prefer to provide two openings and covers 11 on opposite sides of the longitudinal center line of the hood for forcing air into the chamber and to position the cover member 20 for the cowl opening to the rear of and on a longitudinal center line of the forward end of the body, as shown diagrammatically in Fig. 4. In this manner the member or members 11 do not obstruct the flow of air into the aperture 19.

An alternative form of construction is shown in Figs. 5 and 6 providing for the joint operation of the cowl ventilator 11a and the shutters 12a and 13a. Figs. 5 and 6 are on an enlarged scale showing the spaced walls 3 and 4 providing the chamber between the engine compartment 1 and body compartment 2. The cowl ventilator 11a is supported in the same manner as that shown in Fig. 1 having an operating rod 21a and the shutters 12a and 13a are hinged to the forward part of the body adjacent the hood and are here shown of greater length than in Fig. 1 although the length of the shutter may be varied as may be desired. Each of the shutters is provided with a fixed arm 30 and a link 31 in each case extends rearwardly from the arm 30 to connection with the slotted end of an arm 32a or 32b mounted on a cross rod 33 carried in brackets 34 at opposite ends thereof. Centrally of the rod 33 is an arm 32 slotted at its end to engage over a pin 35 on the operating bar 21a. Forward movement of the operating rod 21a pulls on the links 31 and arms 30 swinging the shutters 12a and 13a to open position at the time the cowl ventilator 11a is raised to open position. When the rod 21a is operated to close the cowl ventilator 11a, the shutters are turned to closed position.

This alternative form of construction is of utility in view of the fact that in cold weather or when the cowl ventilator 11a is required to be closed the shutters are closed and there is no discharge of the heated air from the chamber between the partitions or walls 3 and 4. Thus the heat at such times may be transferred from the engine compartment to the body compartment through the heating of the wall 3. It is further to be noted that these partition walls 3 and 4 have perforations in either of the forms of the invention herein illustrated as the wiring to the instrument board usually passes through the wall separating the engine compartment from the body of the vehicle but in the case of wiring these wires either fill the aperture or a flexible apertured rubber plate, as for instance the plate 36 shown in Figs. 5 and 6, may be placed over any aperture through either of the walls 3 or 4 to closely engage the element, as the links 31, passing through the aperture and thus a flow of air from the space between the walls 3 and 4 into the body of the vehicle is prevented.

From the foregoing description it will be evident that the arrangement is simple and comparatively inexpensive in construction; that the forward wall 4, against which the heated air of the engine compartment is forced through operation of the radiator fan, is prevented from transmitting heat to the rear wall 3 forming the forward end of the passenger compartment in that a stream of comparatively cool air is continuously flowing through the chamber between the spaced walls 3 and 4 whether the vehicle be moving or stationary, and that the various objects of the invention are attained by the construction described.

Having thus briefly described my invention, its utility and mode of operation, what I claim and desire to secure by Letters Patent of the United States is—

1. In an automobile having a forward engine compartment and a rear passenger compartment, a dash separating the compartments extending transversely of the vehicle from one side to the other, said dash being of hollow form and closed at its lower edge, a footboard engaging the lower edge of the dash and extending longitudinally thereof, a deflector plate forwardly of the footboard in spaced relation therewith, said hollow dash having a practically centrally disposed opening for egress or ingress of air at the top and openings to atmosphere at opposite sides at the bottom.

2. In an automobile having a forward engine compartment and a rear passenger compartment, a hollow partition separating the said compartments extending transversely of the vehicle from one side to the other, closed at its transverse bottom edge, there being openings provided in the body providing for communication between the hollow partition and atmosphere on opposite sides thereof at the bottom, a manually operable shutter for closing each of said openings, there being an opening provided at the top for movement of air into or out of the interior of the hollow dash, and a hinged deflector plate for covering the said opening.

3. In an automobile having a forward engine compartment and a body providing a passenger compartment, a dash separating the compartments extending transversely of the vehicle from one side to the other, said dash consisting of spaced imperforate walls and providing a support for the forward edge of the vehicle body and rear edge of the hood, there being an opening providing for ingress and egress of air to the space between the walls at the top and openings provided on opposite sides of the vehicle providing for egress of air from the lower end of the space between the walls whereby air flowing into the opening at the top is distributed across the rear face of the forward wall and discharged to opposite sides of the vehicle to carry the heat away therefrom, a hinged shutter for each of said side openings, the lower transverse edge of the chamber being closed, and a manually operable deflector for the upper opening.

4. In an automobile having a forward engine compartment and a body providing a passenger compartment, a dash separating the compartments extending transversely of the vehicle from one side to the other, said dash consisting of spaced imperforate walls, a flange on each of said walls about its sides and upper edge providing respectively a means for supporting the forward edge of the body and the rear edge of the hood, said walls providing a hollow transverse chamber closed at its lower edge, shutters provided adjacent the forward end of the body opening to the lower end only of the chamber on opposite sides, the body having an aperture at the top opening to the chamber, and a manually operable deflector member providing a means in conjunction with the louvres for providing a flow of air through the chamber.

5. In an automobile having a forward engine compartment and a rear passenger compartment, a dash separating the two extending transversely of the vehicle from one side to the other, said dash being of hollow form providing a chamber extending from one side of the vehicle to the other closed at its bottom edge, openings provided in the body at the bottom of the dash providing for ingress or egress of air at the bottom of the chamber, an opening at the top of the chamber, a hinged plate providing a deflector for forcing air into the chamber by movement of the vehicle, said body having an opening into the forward end of the passenger compartment, a deflector plate for controlling the said opening, and manual means for jointly operating the deflectors.

6. In an automobile having a forward engine compartment and a rear passenger compartment, a hollow partition separating the compartments extending transversely of the vehicle from one side to the other closed at its bottom edge, there being openings provided on opposite sides of the body to the hollow partition, shutters therefor hingedly connected with the body, there also being an opening providing for a movement of air into the top of the hollow partition, a hinged deflector plate for covering the top opening, and means for jointly operating the hinged deflector plate and the shutters.

In testimony whereof I sign this specification.

JOHN M. BONBRIGHT.